United States Patent
Maximo et al.

(10) Patent No.: US 8,831,189 B2
(45) Date of Patent: Sep. 9, 2014

(54) DEVICE AUTHENTICATION TECHNIQUES

(75) Inventors: Rui Maximo, Issaquah, WA (US); Dawson Yee, Bellevue, WA (US); Gurdeep S. Pall, Sammamish, WA (US); Roy Kuntz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 2019 days.

(21) Appl. No.: 11/451,183

(22) Filed: Jun. 12, 2006

(65) Prior Publication Data
US 2007/0286376 A1 Dec. 13, 2007

(51) Int. Cl.
*H04M 11/00* (2006.01)
(52) U.S. Cl.
USPC ........................................ 379/93.03; 455/411
(58) Field of Classification Search
USPC ..................................... 379/93.01; 455/432.1
See application file for complete search history.

(56) References Cited

U.S. PATENT DOCUMENTS

| | | | | |
|---|---|---|---|---|
| 5,930,703 | A * | 7/1999 | Cairns | 455/418 |
| 6,799,272 | B1 * | 9/2004 | Urata | 713/171 |
| 6,882,863 | B2 * | 4/2005 | Hansson | 455/556.1 |
| 7,428,413 | B2 * | 9/2008 | Fink | 455/432.1 |
| 7,673,146 | B2 * | 3/2010 | Wiedmann et al. | 713/182 |
| 2003/0065918 | A1 * | 4/2003 | Willey | 713/168 |
| 2004/0172536 | A1 * | 9/2004 | Malville et al. | 713/169 |
| 2005/0131771 | A1 * | 6/2005 | Tischer | 705/26 |
| 2005/0198489 | A1 * | 9/2005 | Wallace et al. | 713/151 |
| 2005/0204083 | A1 * | 9/2005 | Chu | 710/100 |
| 2005/0246529 | A1 * | 11/2005 | Hunt et al. | 713/168 |
| 2006/0206709 | A1 * | 9/2006 | Labrou et al. | 713/167 |
| 2006/0218396 | A1 * | 9/2006 | Laitinen et al. | 713/167 |
| 2006/0259759 | A1 * | 11/2006 | Maino et al. | 713/151 |
| 2007/0016796 | A1 * | 1/2007 | Singhal | 713/183 |
| 2009/0063864 | A1 * | 3/2009 | Guillou | 713/176 |
| 2009/0292920 | A1 * | 11/2009 | Willey | 713/169 |
| 2010/0131347 | A1 * | 5/2010 | Sartipi | 705/14.33 |

* cited by examiner

*Primary Examiner* — Maria El-Zoobi (74) *Attorney, Agent, or Firm* — Andrew Smith; David Andrews; Micky Minhas (57) ABSTRACT

Techniques are provided for authenticating a phone or other device for a user. A phone or other device is provided to the user. A personal identification number is provided to the user. The personal identification number is used to authenticate the phone or other device in the network for the user.

20 Claims, 7 Drawing Sheets

DEVICE AUTHENTICATION TECHNIQUES

BACKGROUND

Authentication processing may be performed by a user in connection with a variety of devices including a computer. As part of the authentication processing, a user may input one or more pieces of authentication information such as a username, password, domain name, and the like. For example, authentication processing may be performed when a user logs onto a computer to establish the user's identity and the user enters authentication information. The authentication information may be entered manually such as using a keyboard of the computer.

A drawback is that the foregoing processing can be tedious and difficult to complete manually in situations where a full keyboard may not be available for use with a device, or where a different language is used and a keyboard for entering characters associated with the different language may not be available.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are provided for authenticating a phone or other device associated with a user in a network. A phone or other device is provided to the user. A personal identification number is provided to the user. The personal identification number is used to authenticate the phone or other device in the network for the user.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
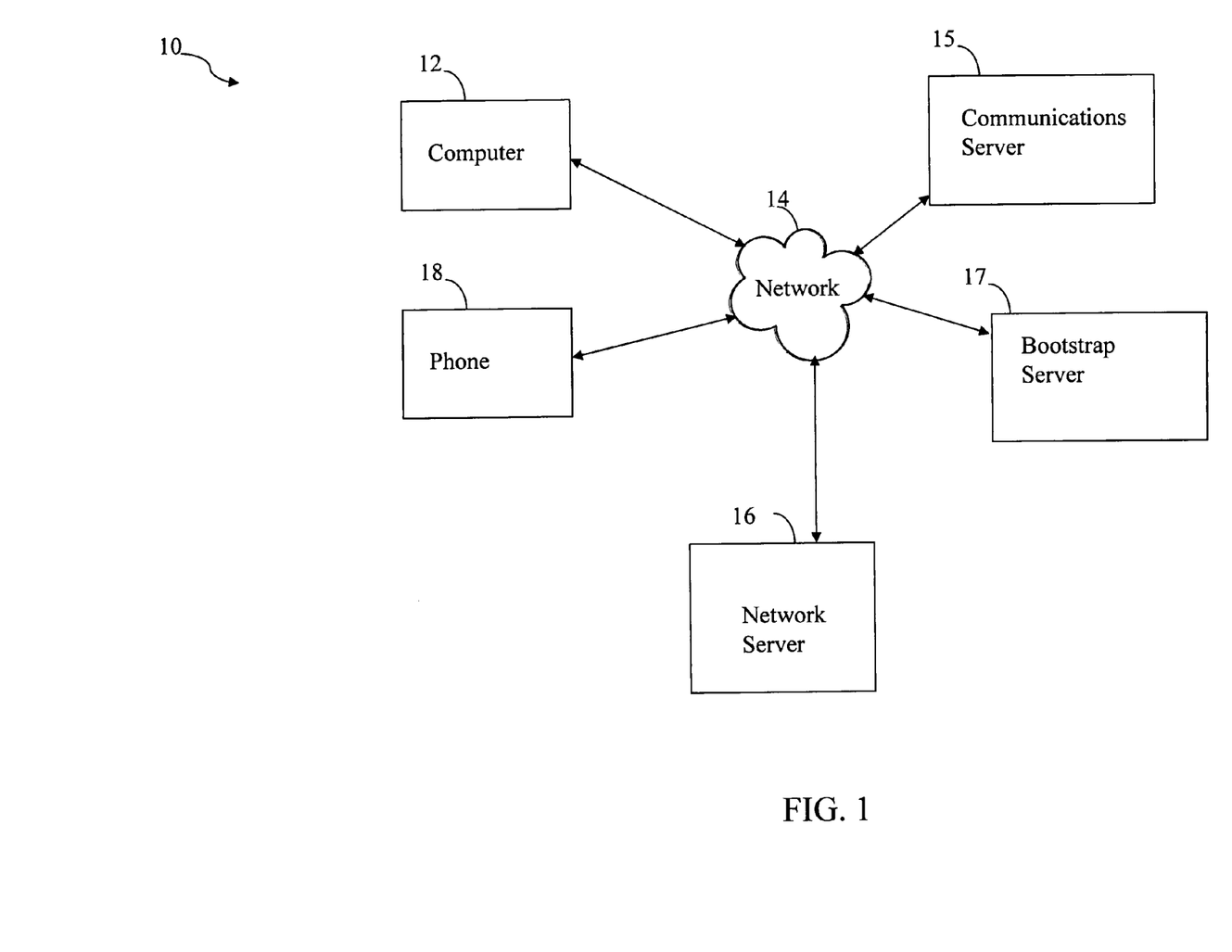
FIG. 1 is an example of an embodiment illustrating an environment that may be utilized in connection with the techniques described herein.

Referring now to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein in connection with device authentication. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 are computer 12, phone 18, network 14, network server 16, bootstrap server 17, and communications server 15. The devices 12 and 18 may communicate with the servers 15, 16, and 17, and each other, over the network 14. Similarly the various servers may communicate with each other and other components not illustrated in the example 10 of FIG. 1.

The computer 12 may be, for example, a computer in a corporate network. The phone 18 may be, for example, an office phone also included in the corporate network. Both the computer 12 and the phone 18 have connectivity to the network 14 and components included in the example 10. It should be noted that although a phone 18 is illustrated in connection with the examples described herein, the authentication techniques described herein may also be used in connection with other devices, such as a PDA, mobile communications device, or other device which may be connected to the network 14 and capable of performing the functions described herein. Additionally, although two devices 12 and 18 are illustrated in FIG. 1, an embodiment may include a different number of devices. The devices 12 and 18 may include a processor used to execute code included in one or more program modules. Described in more detail elsewhere herein are program modules that may be executed by the devices in connection with the techniques described herein. The devices 12 and 18 may operate in a networked environment and communicate with the servers 15, 16, and 17 and other components not shown in FIG. 1. The servers 15, 16, and 17 may operate in a networked environment and communicate with other components also not shown in FIG. 1.

A device, such as the phone 18, may be incorporated into a network for use by a user. For example, Alice may be a new employee and obtain a computer, phone and other equipment for her use. Alice's computer 12 may already be connected to the network 14 and now Alice performs steps to configure her new phone for her use in the network. In connection with one technique, Alice may authenticate her phone for her use in the network in a fashion similar to that as for her computer. For example, Alice may be requested to enter a username, password and possibly other information when establishing a connection for her phone to the network. Entering the password and other information for authentication processing may be cumbersome due to the manner in which the information is entered by Alice. For example, a phone may include a limited number of primarily numeric keys on a typical phone keypad. Entering authentication information such as password including alphabetic and other characters may be troublesome with such a keypad.

In connection with a device such as a phone, the device may typically have a keypad which contains only a subset of those keys as may be included in a keyboard of a computer. The keys on the keypad may be used in connection with manually entering the authentication information. As such, entering a password and other authentication information including non-numeric characters using the keypad of the phone having a limited number of keys can be cumbersome and tedious.

As an alternative, the techniques described herein may be used in connection with authenticating Alice's phone for Alice's use in the network. Once Alice's phone is configured using the techniques described herein, the phone is associated with the user, Alice, and communications, such as incoming phone calls, may be forwarded to her phone.

In connection with the techniques described herein, Alice may be provided with a username and password for an account on the bootstrap server 17. Alice may also be provided with a URL which designates a location on the bootstrap server 17 to be used in connection with configuring and authenticating the phone. Alice logs onto the bootstrap server 17 using her computer 12. Alice enters the username, password, and possibly other information provided over a secure communication channel for authentication to log onto the bootstrap server 17. Once logged on, Alice navigates to the URL provided. Alice may be presented with a web page for phone configuration. Phone configuration may include, for example, Alice selecting a phone number to be associated with her new phone 18. The bootstrap server 17 may generate a personal identification number (PIN). The PIN may include a varying number of digits. In one embodiment, the PIN may include 10 digits although other lengths may be used in connection with the techniques described herein. The PIN may be characterized as a single usage PIN having a temporary and limited lifespan of, for example, 30 minutes. During this lifespan, the PIN may be used by Alice to configure her phone by subsequently entering the PIN into her phone 18, such as using the keypad on the phone 18. If Alice does not configure her phone within the PIN's lifespan, the PIN becomes invalid by the bootstrapping server as a security measure, for example, to cut off misuse by an individual attempting to gain unauthorized access by trying out different number combinations From Alice's view point, once the PIN is entered into the phone, processing occurs between the phone 18 and the servers 15, 16 and 17 in connection with the techniques described herein to configure and authenticate the phone 18 as Alice's phone and also as part of the network.

The network server 16 may be used in connection with performing network operations in connection with network requests such as, for example, a request for obtaining an IP address. The bootstrap server 17 may initiate the processing as described herein in connection with authentication of the phone 18 for a user such as Alice. The communications server 15 may be used in connection with facilitating communications between devices connected to the network 14. For example, the communications server 15 may be used in connection with registering users and associating authenticated devices with the registered users. The communications server 15 may facilitate routing of various received communications to the devices, such as the computer 12 and the phone 18, connected to the network 14.

Additional functions performed by the components of FIG. 1 are described in following paragraphs.

It will be appreciated by those skilled in the art that although the components of FIG. 1 are shown in the example as communicating in a networked environment, the components may communicate with other components utilizing different communication mediums. For example, the servers 15, 16, and/or 17 may communicate with one or more components utilizing a network connection, and/or other type of link known in the art including, but not limited to, the Internet, an intranet, or other wireless and/or hardwired connection(s).

Figure 2:
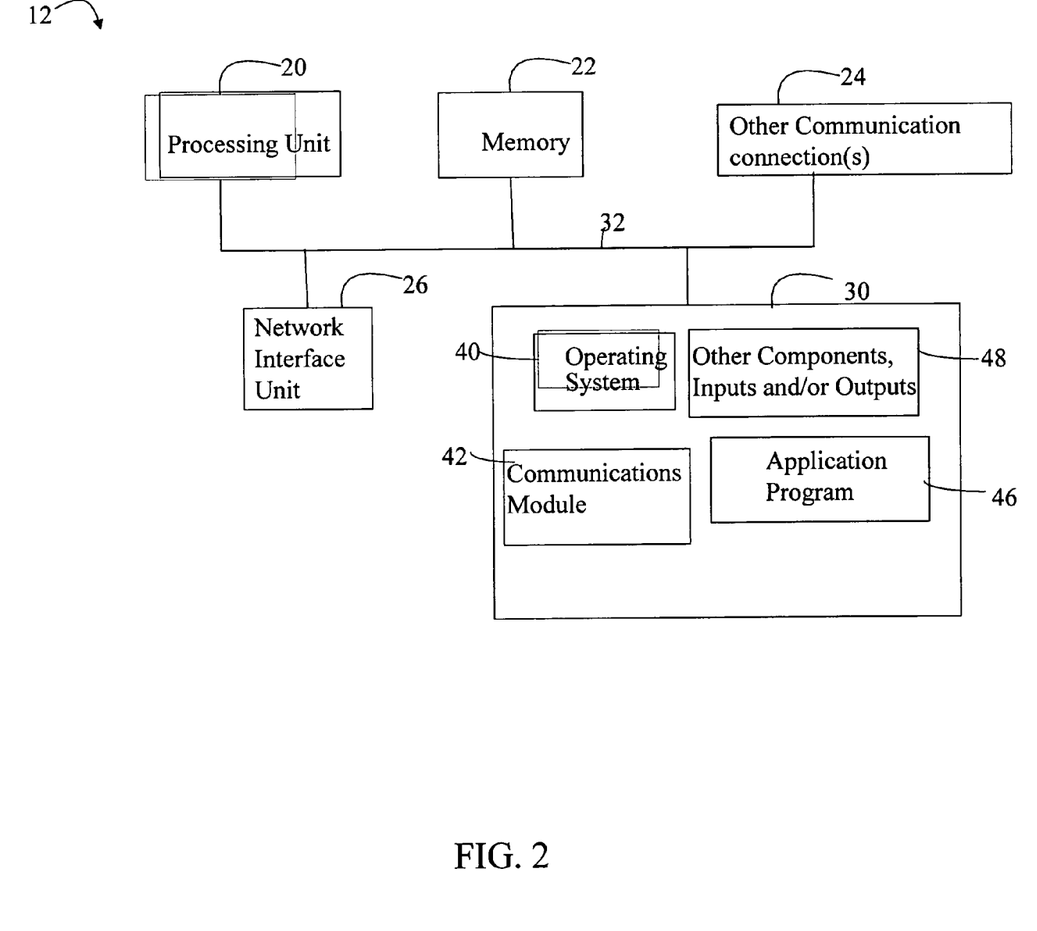
FIG. 2 is an example of components that may be included in an embodiment of a computer for use in connection with performing the techniques described herein.

Referring now to FIG. 2, shown is an example of components that may be included in the computer 12, as may be used in connection with performing the various embodiments of the techniques described herein. The computer 12 may include one or more processing units 20, memory 22, a network interface unit 26, storage 30, one or more other communication connections 24, and a system bus 32 used to facilitate communications between the components of the computer 12.

Depending on the configuration and type of computer 12, memory 22 may be volatile (such as RAM), non-volatile (such as ROM, flash memory, etc.) or some combination of the two. Additionally, the device 12 may also have additional features/functionality. For example, the device 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the computer 12. The storage 30 in one embodiment may be a mass-storage device with associated computer-readable media providing non-volatile storage for the computer 12. Although the description of computer-readable media as illustrated in this example may refer to a mass storage device, such as a hard disk or CD-ROM drive, it will be appreciated by those skilled in the art that the computer-readable media can be any available media that can be accessed by the computer 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by the computer 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The computer 12 may also contain communications connection(s) 24 that allow the user computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 24 are an example of communication media.

In one embodiment, the computer 12 may operate in a networked environment as illustrated in FIG. 1 using logical connections to remote computers and other components through a network. The computer 12 may connect to a network including the computer 12 and other network elements through a network interface unit 26 connected to bus 32. The network interface unit 26 may also be utilized in connection with other types of networks and/or remote systems and components.

One or more program modules and/or data files may be included in storage 30. During operation of the computer 12, one or more of these elements included in the storage 30 may also reside in a portion of memory 22, such as, for example, RAM for controlling the operation of the computer 12. The example of FIG. 2 illustrates various components including an operating system 40, a communications module 42, one or more application programs 46, and other components, inputs, and/or outputs 48.

The operating system 40 may be any one of a variety of commercially available or proprietary operating systems. The operating system 40, for example, may be loaded into memory in connection with controlling operation of the user computer. One or more application programs 46 may execute in the user computer 12 in connection with performing user tasks and operations. The particular application programs, if any, may vary with computer.

The communications module 42 may be used in connection with facilitating communications between the computer 12 and other components in the network 14.

Figure 3:
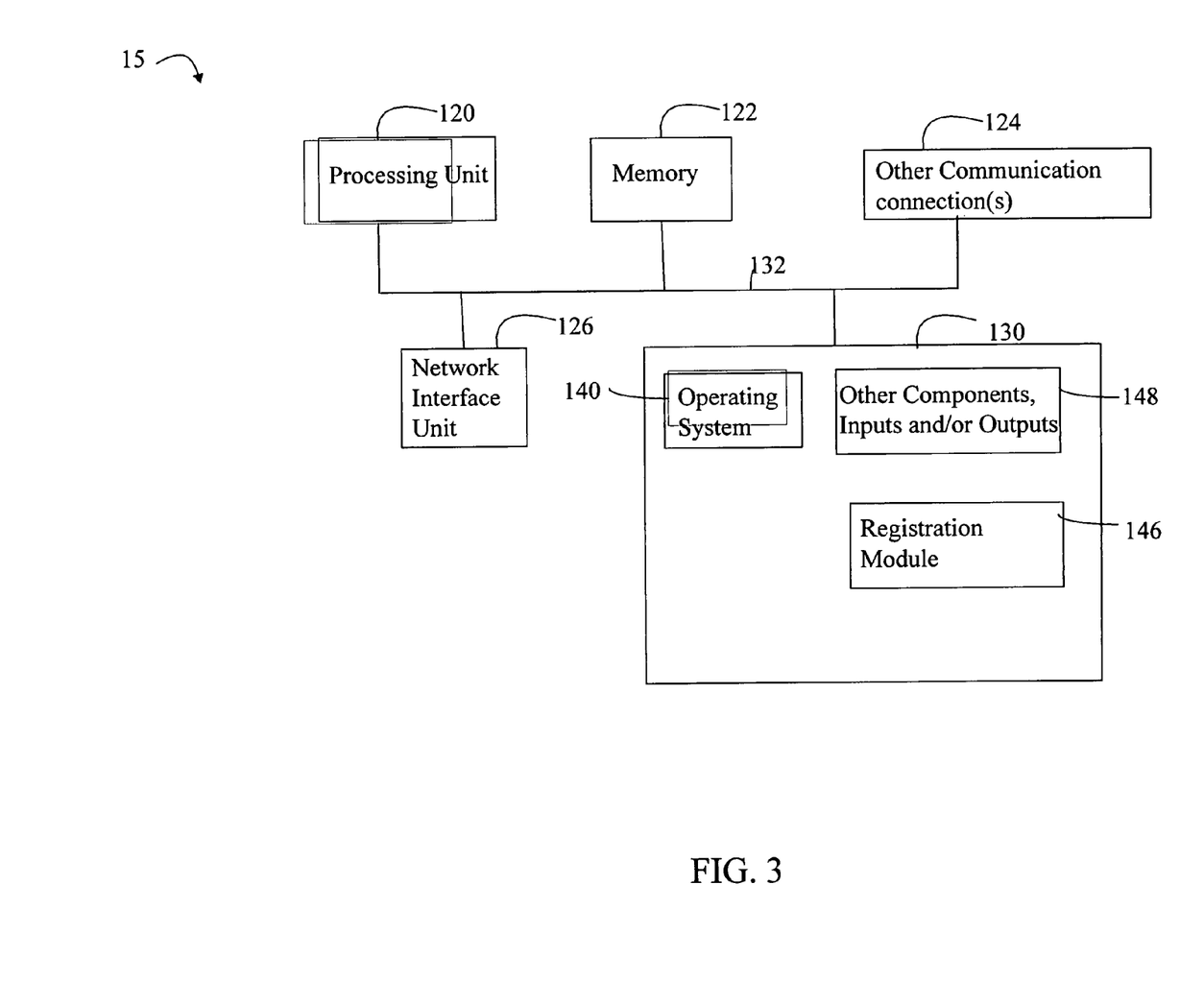
FIG. 3 is an example of components that may be included in an embodiment of a communications server for use in connection with performing the techniques described herein.

Referring now to FIG. 3, shown is an example of components that may be included in the communications server 15 and used in connection with performing the various embodiments of the techniques described herein. As illustrated in FIG. 3, an embodiment of the communications server 15 may include components similar to those described in connection with FIG. 2. Additionally, the server 15 may include a registration module 146. The registration module 146 may be used in connection with registering a user, such as Alice, for communications in the network 14. As will be described in following paragraphs in connection with the techniques described herein, the phone 18 is authenticated with the communications server 15 in order to register the phone as Alice's phone so that communications may be appropriately routed to Alice.

Although only details of the computer 12 and the communications server 15 have been described, it will be appreciated by those skilled in the art that the network server 16, bootstrap server 17, and phone 18 may include components similar to those as described herein. The servers 16 and 17 and the phone 18 may include additional modules for performing the various operations and tasks performed by each as described herein in more detail.

It will also be appreciated by those skilled in the art that the techniques described herein may be used in connection with other devices than the phone 18 and may include components similar to those as described herein for the phone 18.

It should be noted that although each of the servers 15, 16, and 17 are illustrated in this example as separate servers, the functionality performed by the servers 15, 16 and 17 may be included in one or more physical server system.

Figure 4:
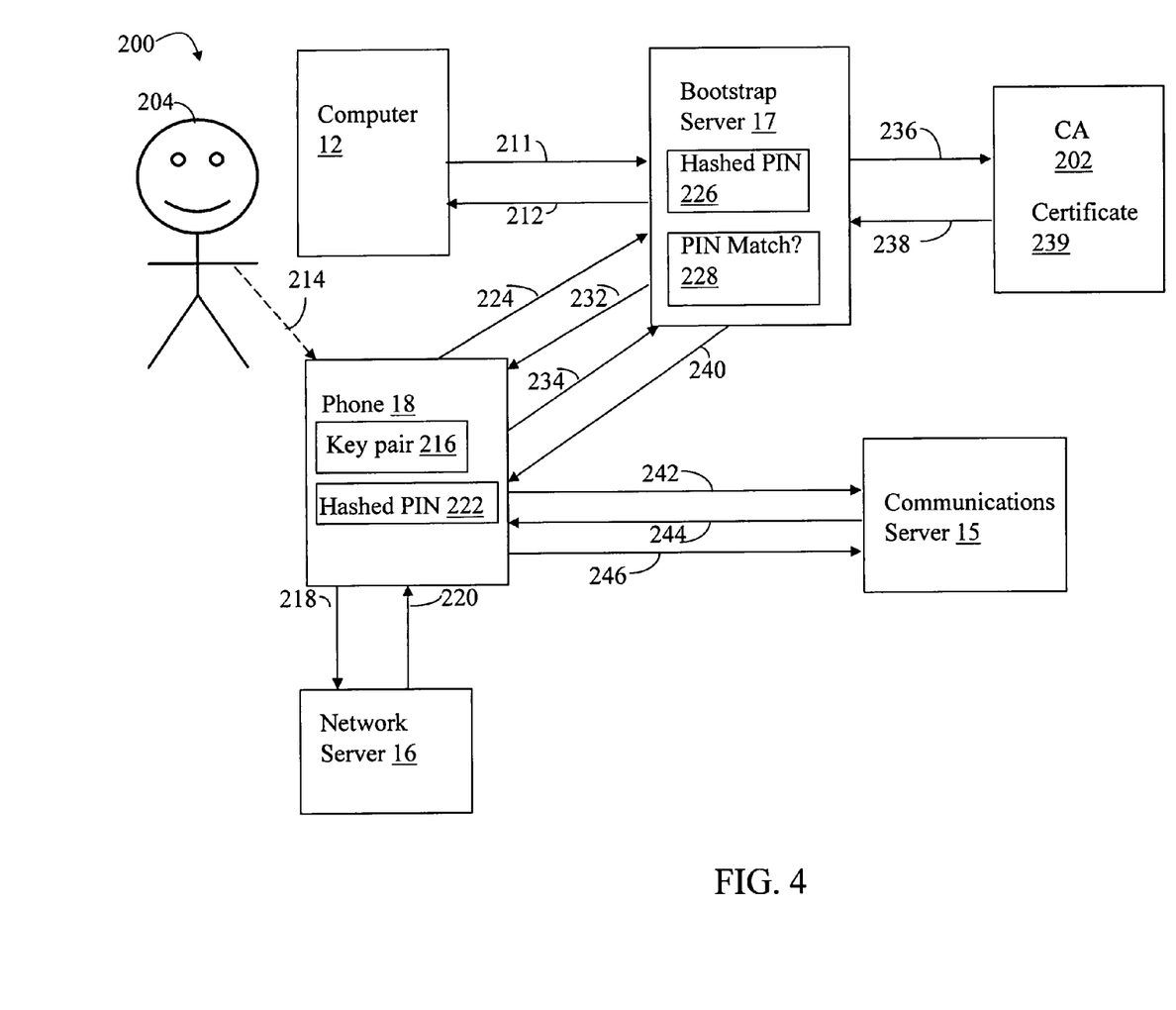
FIG. 4 is an example illustrating the data flow between components utilizing the techniques described herein.

Referring now to FIG. 4, shown is an example illustrating the data flow between components for performing the techniques described herein. The example 200 includes the computer 12, communications server 15, network server 16, bootstrap server 17, and phone 18. Additionally included in the example 200 is a certificate authority (CA) 202.

The CA 202 may be used in connection with generating digital certificates. The CA 202 maybe a module included in another component having connectivity to the network 14.

With reference to the example 200, the user 204 may log on to the bootstrap server 17 as described elsewhere herein using any username, password, and possibly other authentication information. The process of authenticating to the bootstrap server 17 as just described is illustrated with element 211. It should be noted that communications performed herein may be over a secure communications channel such as, for example, using SSL or other techniques known in the art.

Once the user has logged on to the bootstrap server 17, the bootstrap server 17 may generate a PIN that is returned to the computer 12, as illustrated with element 212. The user 204 may proceed to enter the PIN into the phone 18. In one embodiment, the user 204 may manually enter the PIN into the phone 18 using the phone's keypad. Entry of the PIN is illustrated by element 214.

The phone 18 creates a public/private key pair 216. The private key in this embodiment is marked as non-exportable indicating that the private key cannot be copied off of the phone. The private key may also be characterized as read protected and may only be designated for use by the phone 18 in connection with the techniques described herein. As part of processing performed by the phone 18 when connecting to the network 14, the phone 18 may contact the network server 16 in order to obtain a network address. The network address may be used by the phone 18 to identify the phone 18 within the network. Additionally, the phone 18 may obtain the address of the bootstrap server 17 from the network server 16. Recall that the bootstrap server 17 is the server to which the user 204 has logged into and is also the server which has generated the PIN. Element 218 represents the phone 18 issuing a request to the network server 16 to obtain the phone's network address and the address of the bootstrap server. Element 220 represents the response from the network server 16 returning the phone's network address and the address of the bootstrap server.

Once the phone 18 has received a response, the phone 18 is ready for user authentication. The user may put the phone into an authentication mode and then enter the PIN, such as a 10-digit PIN, that the user may have previously obtained from the bootstrap server (e.g., entry of the PIN by the user is illustrated by element 214 as also described above). The phone 18 may hash the PIN input by the user producing a hashed PIN 222. As illustrated by element 224, the phone 18 attempts to authenticate to the bootstrap server 17 by sending the hashed PIN 222 to the bootstrap server 17. As illustrated by element 226, the bootstrap server 17, using its copy of the PIN, generates hashed PIN 226. It should be noted that both the phone 18 and bootstrap server 17 may perform the same hashing operation using any one of a variety of different hashing algorithms known in the art. Examples of hashing algorithms that may be used in an embodiment may include SHA1, MD5 and the like.

As illustrated by element 228, the bootstrap server 17 performs processing to determine if its hashed PIN 226 matches the hashed PIN 222 received from the phone 18. If the hashed PINs do not match, the bootstrap server 17 does nothing.

Rather than having the phone 18 send a hashed PIN which may be compared by the bootstrap server 17, an embodiment may utilize the PIN in an unhashed form in connection with the techniques described herein so that the phone sends the PIN to the bootstrap server 17, and the server 17 compares the PIN received from the phone with the PIN as maintained on the server 17.

If the hashed PINs do match, a secure communication channel is established between the bootstrap server 17 and the phone 18 as communicated to the phone 18 and illustrated by element 232. Once the secure communication channel is established, the phone 18 transmits the public key to the bootstrap server 17, as illustrated by element 234. It should be noted that the secure channel can be established before the phone sends the hashed PIN to the bootstrap server 17. In this case, the bootstrap server authenticates itself to the phone and may establish a secure channel, such as using SSL (Secure Socket Layer). The bootstrap server 17 verifies the phone using the hashed PIN as proof that the user has physical control of the device. The bootstrap server 17 sends a certificate request to the CA 202 on behalf of the user 204. In one embodiment, the certificate request may include the public key and other identification information identifying the user 204, such as Alice. In one embodiment, the identification information included in the certificate request may include a username, and possibly other information used to authenticate, or log on, to the communications server 15 as the user 204. The identification information included in the certificate request will be used in subsequent steps by the phone 18 to authenticate to the communications server 15 allowing the phone 18 to function as a device associated with user 204. The process of sending a certificate request is illustrated by element 236 causing the CA 202 to generate a digital certificate 239. The digital certificate 239 is returned to the bootstrap server 17 as illustrated by element 238.

The bootstrap server 17 then sends the digital certificate and the identification information needed to log on to the communication server 15 to the phone 18 as illustrated by element 240. Once the device 18 receives the foregoing information as represented by 240, the device 18 attempts to log on to the communications server 15 as illustrated by element 242.

An embodiment may use any one of a variety of different techniques in connection with the device authenticating, or logging on, to the communications server 15. In one embodiment, the device may contact the communications server, as illustrated by element 242, sending identification information (e.g., the username, and other user 204 information) to log on to the communications server, and the digital certificate. The communications server 15 makes sure the identification information (e.g., username, certificate, and the like for logging into the communications server 15) is correct. Additionally, the communications server 15 may send a challenge to the device 18 to ensure the identity of the user performing the authentication for the device. In one embodiment, the communications server 15 may send a randomly generated string or message to the phone 18 as illustrated by element 244. The phone 18 is requested to encrypt the message with the device's private key. The phone 18 then sends the encrypted message to the communications server 15 as illustrated by element 246. The communications server 15 then decrypts the received encrypted message using the public key included in the digital certificate. If the decrypted message matches the original message sent by the communications server 15, the added step of authentication processing (e.g., the challenge) is deemed successful. If the challenge is successful and the identification information is correct, the phone 18 is authenticated to the communications server 15. The phone 18 can then be used for routing incoming and/or outgoing communications as appropriate for the associated user 204.

The PIN as generated by the bootstrap server 17 may be entered into the phone 18 or other device in a variety of different ways. As described herein, the user may manually enter the PIN using the keypad on the phone 18. Additionally, an embodiment may communicate the PIN to the phone in a variety of other ways. The PIN may be communicated from the user computer 12 to the phone 18 across a wireless link, a hardwired connection, using audio tones, a barcode sequence, and the like.

Figure 5:
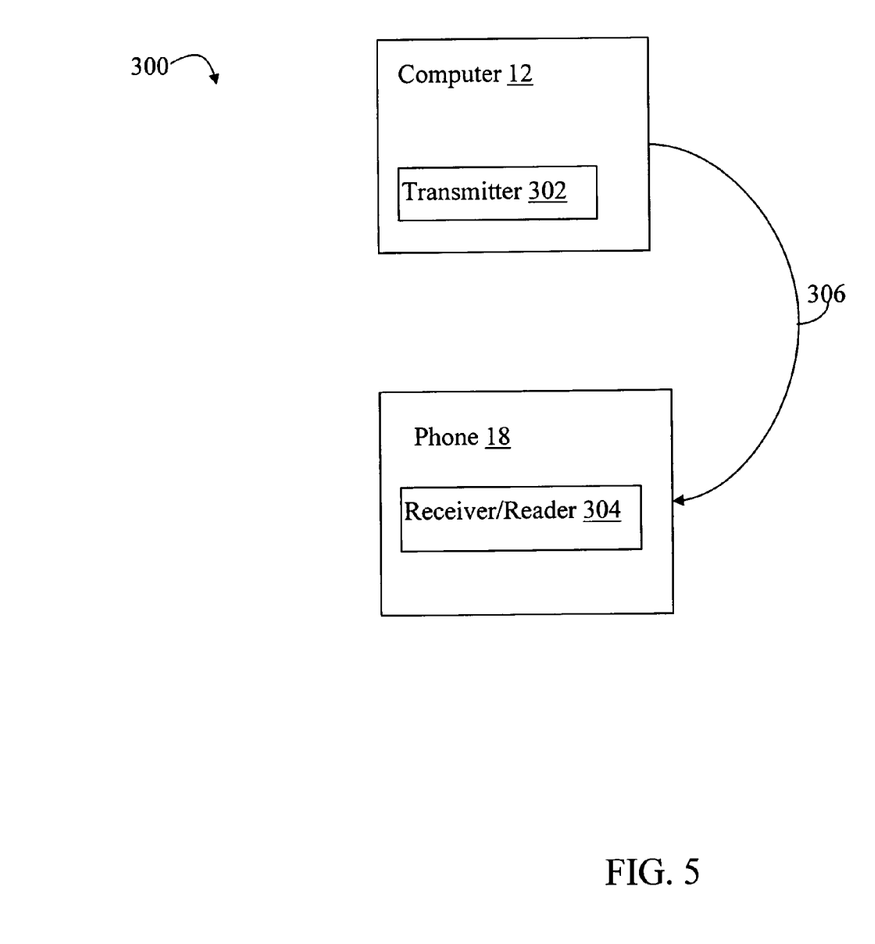
FIG. 5 is an example of other components that may be included in a computer and a phone for use in connection with transmitting and receiving the personal identification number with the techniques described herein.

Referring now to FIG. 5, shown is an example of the computer 12 and the phone 18. In the example 300 as illustrated by 306, the PIN may be communicated from the computer 12 to the phone 18. Element 306 may represent any one of a variety of different links, connections, or entry mechanisms used with different techniques to communicate the PIN to the phone. For example, the element 306 may represent the manual entry of information such as when Alice prints out the PIN at her computer and depresses appropriate keys on the keypad of the phone for the PIN. The computer 12 may also include a transmitter 302 and the phone 18 may include a receiver/reader component 304. The transmitter 302 may be used to transmit the received PIN, such as in connection with a wireless or other communications technique, to the receiver/reader 304 of the phone 18. The PIN may be communicated, for example, using an RF link, an IR link, magnetic coupling link, handset induction coupling, and the like. The PIN may be communicated over a hardwired connection, such as over a USB connection, between the components 12 and 18.

For example, once the PIN is received at the computer 12, the user can then run a program on the computer to request that the PIN be broadcast wirelessly to the phone device. Upon receipt of the PIN, the phone which is network connected indicates to the user that a PIN was received (e.g., such as by sound or visual indicator). Processing may be performed as described elsewhere herein to ensure that the PIN sequence entered into the phone is the same as the PIN sequence generated by the bootstrap server allowing the user to be associated with the phone.

In another embodiment, processing may be performed to communicate the PIN to the phone using audio tones. For example, the user may press a key sequence on the telephone to allow the phone to accept the PIN wirelessly via the speakerphone microphone, or a handset microphone. The PIN received at the computer 12 may be broadcast wirelessly to the phone via tones broadcast over the computer speakers. The phone device, connected to the network, receives the tones and decodes the PIN, and indicates to the user that a PIN was received (e.g., such as by sound or visual indicator). Processing may be performed as described elsewhere herein to ensure that the PIN sequence entered into the phone is the same as the PIN sequence generated by the bootstrap server allowing the user to be associated with the phone.

The PIN may also be communicated to the phone using barcodes. The PIN received at the user computer may optionally be printed out in a bar-coded form. The user can then place the printout of the bar-coded PIN in front of a camera or other bar code reader of the phone 18 and have the phone 18 read the PIN. The camera or other bar code reader may be incorporated as an element in the phone 18, or may otherwise be a component coupled to the phone 18. The phone which is network connected indicates to the user that a PIN was received (e.g., such as by a sound or visual indicator). Processing may be performed as described elsewhere herein to ensure that the PIN sequence entered into the phone is the same as the PIN sequence generated by the bootstrap server allowing the user to be associated with the phone.

The user may be sent an email notifying him/her that the new phone association has been successful.

Figure 6:
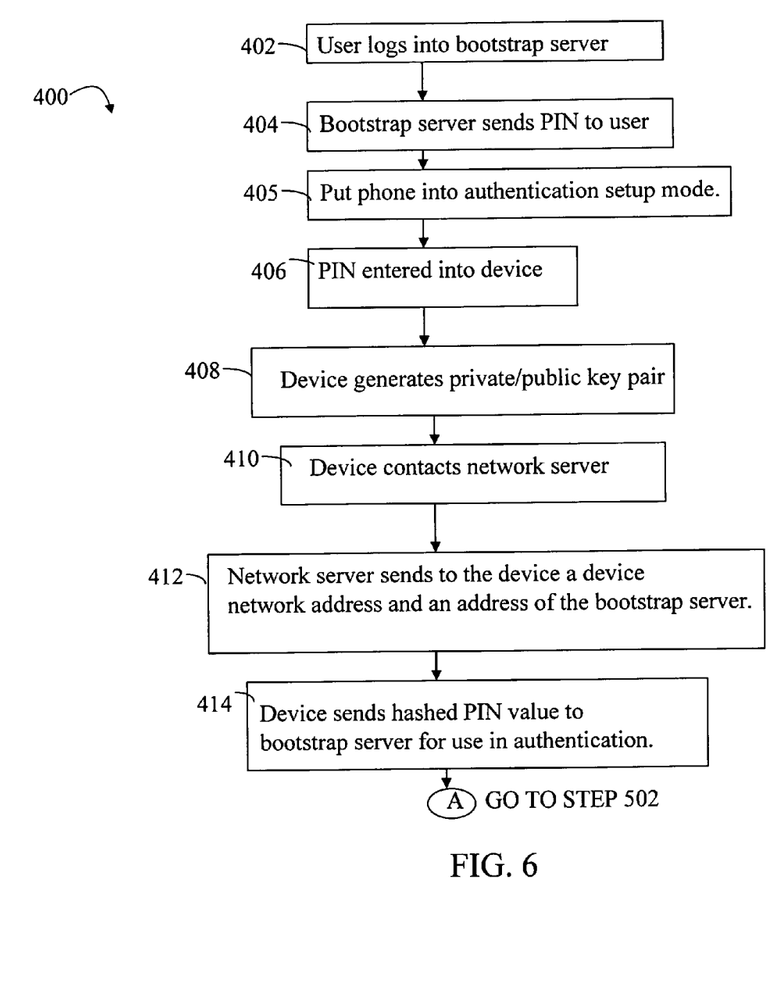
FIGS. 6 and 7 are flowcharts of processing steps that may be performed in an embodiment in connection with the techniques described herein.
Figure 7:
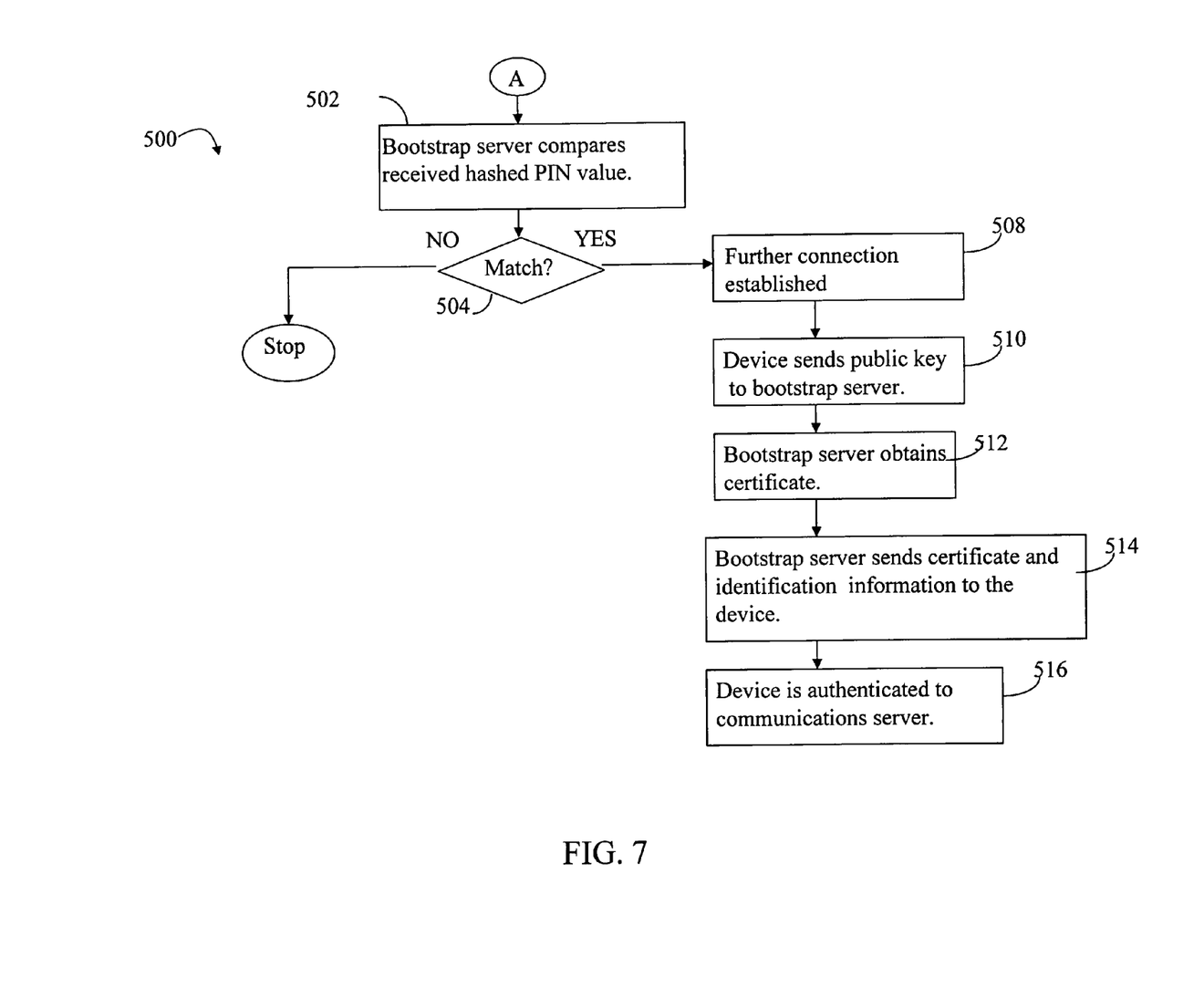

What will now be described in connection with FIGS. 6 and 7 are flowcharts of processing steps which summarize processing as just described in connection with device authentication.

At step 402, a user logs into the bootstrap server. At step 404, the bootstrap server sends a PIN to the user at the user computer. At step 405, the user puts the phone into an authentication setup mode. At step 406, the PIN is entered into the device. At step 408, the device generates the private/public key pair. At step 410, the device contacts a network server. At step 412, the network server responds by sending to the device a device network address and the address of the bootstrap server within the network. At step 414, after the PIN is input, a hashed PIN value is determined and sent by the device to the bootstrap server for use in authentication of the device. At step 502, the bootstrap server compares its own hashed PIN value to the received hashed PIN value. At step 504, a determination is made as to whether the hashed PIN values match. If not, processing stops If step 504 evaluates to yes, control proceeds to step 508 where a further or additional connection between the device and the bootstrap server is established. At step 510, the device sends the public key to the bootstrap server. At step 512, the bootstrap server obtains a digital certificate based on the received public key. At step 514, the bootstrap server sends the certificate and identification information for logging on to the communication server to the device. At step 516, processing is performed for authenticating the device to the communications server using the certificate and identification information received at step 514.

Using the techniques described herein, the phone 18 or another device may be authenticated and associated with a user. Once the phone or other device is authenticated, subsequent processing may be performed. Such subsequent processing may include, for example, configuring the phone or other device just authenticated in accordance with one or more configuration options associated with the particular user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for authenticating a phone for a user comprising:
    logging the user onto a server in a network from a computer using authentication information;
    providing a personal identification number from the server to the computer over a secure communications channel over the network, without using the phone;
    receiving the personal identification number from the phone at the server; and
    using the personal identification number at the server to authenticate the phone in the network for the user.

2. The method of claim 1, further comprising:
    providing the authentication information to the user, the authentication information used by the user for logging onto the server, wherein the authentication information includes a username and password.

3. The method of claim 2, further comprising:
    generating, by the server, the personal identification number; and
    communicating the personal identification number to the user, wherein the personal identification number has a predetermined lifespan of validity for use in connection with authenticating the phone.

4. The method of claim 3, further comprising:
    entering said personal identification number into said phone.

5. The method of claim 4, wherein said personal identification number is transmitted to said phone using a wireless connection.

6. The method of claim 5, wherein said wireless connection includes at least one of: an RF link, an IR link, and a magnetic coupling link.

7. The method of claim 4, wherein said personal identification number is transmitted to said phone using audio tones.

8. The method of claim 4, wherein said personal identification number is manually entered at said phone using a keypad.

9. The method of claim 4, wherein said personal identification number is in a bar-coded form which is read using a reader at said phone.

10. The method of claim 4, further comprising:
    hashing, by said phone, said personal identification number entered at said phone generating a first hash value; and
    hashing, by said server, a copy of said personal identification number as maintained at said server generating a second hash value.

11. The method of claim 10, further comprising:
    comparing, by said server, said first and second hash values;
    if said first and second hash values do not match, not successfully completing authentication processing for the phone for the user.

12. The method of claim 11, wherein if said first and second hash values match, a connection is established between said phone and said server and said phone sends a public key to the server.

13. The method of claim 12, wherein said server obtains a digital certificate in accordance with said public key and transmits said digital certificate and identification information to log onto a communications server to the device.

14. The method of claim 13, wherein said device is authenticated to said communications server in accordance with said digital certificate and identification information.

15. A method for authenticating a device for a user comprising:
    providing authentication information to the user, wherein the authentication information is used by the user for logging onto a server in a network using a computer;
    using the authentication information by the server to authenticate the user;
    generating by the server a single-use personal identification number having a predetermined lifespan;
    transmitting the personal identification number to the computer over a secure communications channel over the network, without using the device;
    receiving the personal identification number from the device at the server; and
    using the personal identification number at the server to authenticate the device in the network for the user.

16. The method of claim 15, wherein said personal identification number is transmitted to said device from the computer using a wireless connection.

17. The method of claim 15, wherein said personal identification number is communicated to said device from the computer using audio tones.

18. The method of claim 15, wherein said personal identification number is input manually using a keypad of said device.

19. The method of claim 18, wherein said keypad includes only telephone keypad key assignments.

20. A computer storage medium comprising executable code for authenticating a phone comprising code that:
provides authentication information to the user, wherein the authentication information is used by the user for logging onto a server in a network using a computer;
uses the authentication information by the server to authenticate said user;
generates by the server a personal identification number;
transmits the personal identification number to the computer over a secure communications channel over the network, without using the phone; and
receives the personal identification number from the phone at the server; and
uses the personal identification number at the server to authenticate the phone in the network for the user.

* * * * *